United States Patent
Parsons (10) Patent No.: US 11,898,500 B2
(45) Date of Patent: Feb. 13, 2024

(54) INLET CONFIGURATION ENABLING RAPID IN-FLIGHT ENGINE RESTART

(71) Applicant: Bell Textron Inc., Fort Worth, TX (US)

(72) Inventor: Thomas Dewey Parsons, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 195 days.

(21) Appl. No.: 17/130,358

(22) Filed: Dec. 22, 2020

(65) Prior Publication Data

US 2022/0195946 A1 Jun. 23, 2022

(51) Int. Cl.
*F02C 9/20* (2006.01)
*F02C 7/262* (2006.01)
*F02C 7/057* (2006.01)
*F02C 7/26* (2006.01)

(52) U.S. Cl.
CPC ............ *F02C 9/20* (2013.01); *F02C 7/057* (2013.01); *F02C 7/26* (2013.01); *F02C 7/262* (2013.01); *F05D 2220/323* (2013.01); *F05D 2260/85* (2013.01); *F05D 2270/02* (2013.01); *F05D 2270/09* (2013.01)

(58) Field of Classification Search
CPC .... F02C 9/20; F02C 7/26; F02C 7/262; F02C 7/057; F02C 7/042; B64D 33/02; B64D 2033/0286; B64D 2033/0293
See application file for complete search history.

(56) References Cited

U.S. PATENT DOCUMENTS

| | | | | |
|---|---|---|---|---|
| 3,483,676 A * | 12/1969 | Sargisson | ................ | F02C 7/052 55/306 |
| 3,568,694 A * | 3/1971 | Johnson | ................ | B64D 33/02 60/264 |
| 6,810,676 B2 * | 11/2004 | O'Connor | ................ | F02C 9/28 60/790 |
| 6,988,368 B2 * | 1/2006 | O'Connor | ................ | F02C 9/28 706/45 |
| 7,575,014 B2 * | 8/2009 | Stelzer | ................ | F02C 7/05 137/15.1 |
| 10,227,931 B2 * | 3/2019 | Stockwell | ............. | F04D 29/563 |
| 10,738,698 B2 * | 8/2020 | Simonetti | ................ | F02C 9/54 |
| 2003/0110777 A1 * | 6/2003 | O'Connor | ................ | F02C 9/28 60/778 |

(Continued)

*Primary Examiner* — Alain Chau
(74) *Attorney, Agent, or Firm* — Fogarty LLP (57) ABSTRACT

Embodiments are directed to systems and methods for controlling an aircraft engine inlet comprises determining a required engine RPM for an engine in-flight restart based upon current aircraft parameters, detecting a command to initiate the engine in-flight restart, and managing a position of an engine inlet barrier to control a volume of air entering an engine intake, wherein the ram air causes an engine turbine to achieve the required engine RPM. The required engine RPM may be an N1 gas generator RPM. The engine inlet barrier may be a hinged door positioned within the engine inlet or a series of inlet variable guide vanes that are configured to rotate between a closed position and an opened position. The position of the engine inlet barrier may be controlled by a flight control computer or an engine control computer.

20 Claims, 8 Drawing Sheets

(56) References Cited

U.S. PATENT DOCUMENTS

| | | | |
|---|---|---|---|
| 2005/0028533 A1* | 2/2005 | O'Connor | F02C 7/26 60/778 |
| 2007/0022723 A1* | 2/2007 | Stelzer | B64D 33/02 55/502 |
| 2007/0025838 A1* | 2/2007 | Stelzer | B64D 33/02 415/121.2 |
| 2013/0074519 A1* | 3/2013 | Ertz | F02C 7/057 60/802 |
| 2013/0192195 A1* | 8/2013 | Wehmeier | F02C 3/13 60/226.3 |
| 2016/0281611 A1* | 9/2016 | Stockwell | F02C 9/54 |
| 2018/0080380 A1* | 3/2018 | Simonetti | B64D 35/08 |
| 2018/0237149 A1* | 8/2018 | Manoukian | B64D 45/0005 |
| 2018/0237153 A1* | 8/2018 | Manoukian | B64D 41/00 |
| 2019/0322379 A1* | 10/2019 | Mackin | F02C 7/057 |
| 2020/0173367 A1* | 6/2020 | Husband | F01D 19/00 |
| 2020/0173369 A1* | 6/2020 | Husband | F02C 7/262 |

* cited by examiner

INLET CONFIGURATION ENABLING RAPID IN-FLIGHT ENGINE RESTART

BACKGROUND

Gas turbine engines are widely used as power plants in all types of vehicles including aircraft, land based vehicles, and ships. A particular aircraft application is to provide power systems for rotorcraft and tiltrotor aircraft. Turbine engines compress inlet air in a compressor, which is then mixed with fuel and ignited to drive a compressor turbine. The heated, expanding air-fuel mixture drives an aerodynamically-coupled power turbine that is connected to a power shaft, which is connected through a transmission apparatus to a driven element such as a proprotor system or propeller. There are numerous considerations involved in the design of aircraft, such as rotorcraft, including size, weight, power efficiency, fuel efficiency, noise, vibration, structural loads, and so forth. For vertical take-off and landing (VTOL) aircraft, such as rotorcraft and tiltrotor aircraft, operation in level flight or cruise mode typically requires less power and, therefore, less fuel, than during the take-off and landing phases of flight. For VTOL aircraft, this means the engine usually operates at part-power while in cruise mode.

SUMMARY

Embodiments are directed to systems and methods for controlling ram airflow into an engine during in-flight restart in order to optimize the start sequence. Engine inlet guide vanes or other hinged-door configurations are used to manage the ram airflow in an engine inlet. The ram air is used to force the engine to windmill prior to engaging a starter to initiate the start sequence, allowing for a more rapid engine restart.

In an example embodiment, a method for controlling an aircraft engine inlet comprises determining a required engine RPM for an engine in-flight restart based upon current aircraft parameters, detecting a command to initiate the engine in-flight restart, and managing a position of an engine inlet barrier to control a volume of air entering an engine intake, wherein the ram air causes an engine to achieve the required engine RPM. The required engine RPM may be the compressor RPM. The engine inlet barrier may be a hinged door positioned within the engine inlet or a series of inlet guide vanes that are configured to rotate between a closed position and an opened position. The position of the engine inlet barrier may be controlled by a flight control computer or an engine control computer. The required engine RPM may be determined from aircraft performance chart data.

The method may further comprise monitoring current aircraft parameters, such as an airspeed, an altitude, and an outside air temperature, wherein the required engine RPM for an optimal engine in-flight restart is updated at regular intervals or when the current aircraft parameters change by a threshold amount.

The method may further comprise detecting a command to shut down the engine while in flight and managing the position of the engine inlet barrier to block ram air from entering the engine intake. During a shutdown sequence, the engine inlet barrier may be closed when the engine is below a minimum engine RPM.

Managing the position of the engine inlet barrier may comprise monitoring a current engine RPM, monitoring parameters of the ram air in the engine intake and adjusting the position of the engine inlet barrier to maximize the rate at which the engine achieves the required engine RPM.

Managing the position of the engine inlet barrier may comprise adjusting the position of the engine inlet barrier according to a predetermined schedule.

Managing the position of the engine inlet barrier may comprise providing a command to one or more actuators to adjust the engine inlet barrier to conform to a calculated engine inlet area.

In another embodiment, an aircraft comprises an engine inlet configured to provide air to an engine during flight, an engine inlet barrier configured to manage a volume of air provided to the engine, and a flight control system. The flight control system is configured to determine a required engine RPM for an engine in-flight restart based upon current aircraft parameters and manage a configuration of the engine inlet barrier to control the volume of air entering the engine inlet during the engine in-flight restart, wherein the volume of air is selected to cause an engine to achieve the required engine RPM. The engine inlet barrier may be a hinged door positioned within the engine inlet or a series of inlet guide vanes that are configured to rotate between a closed position and an opened position.

The flight control system may be further configured to determine the required engine RPM after detecting a command to initiate the engine in-flight restart.

The flight control system may be further configured to detect a command to shut down the engine while in flight and to manage the position of the engine inlet barrier to block air from entering the engine intake.

In a further embodiment, a flight control computer for an aircraft comprises one or more processors, one or more computer-readable storage media having stored thereon computer-executable instructions that, when executed by the one or more processors, causes the processors to perform a process. The process may comprise determining a required engine RPM for an engine in-flight restart based upon current aircraft parameters and managing a configuration of an engine inlet barrier to control a volume of air entering an engine intake during the engine in-flight restart, wherein the volume of air is selected to cause an engine to achieve the required engine RPM.

The process may further comprise monitoring a current engine RPM during an engine in-flight restart, monitoring parameters of the air in the engine intake, and adjusting the position of the engine inlet barrier to maximize the rate at which the engine achieves the required engine RPM.

The process may further comprise adjusting the position of the engine inlet barrier according to a predetermined schedule.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
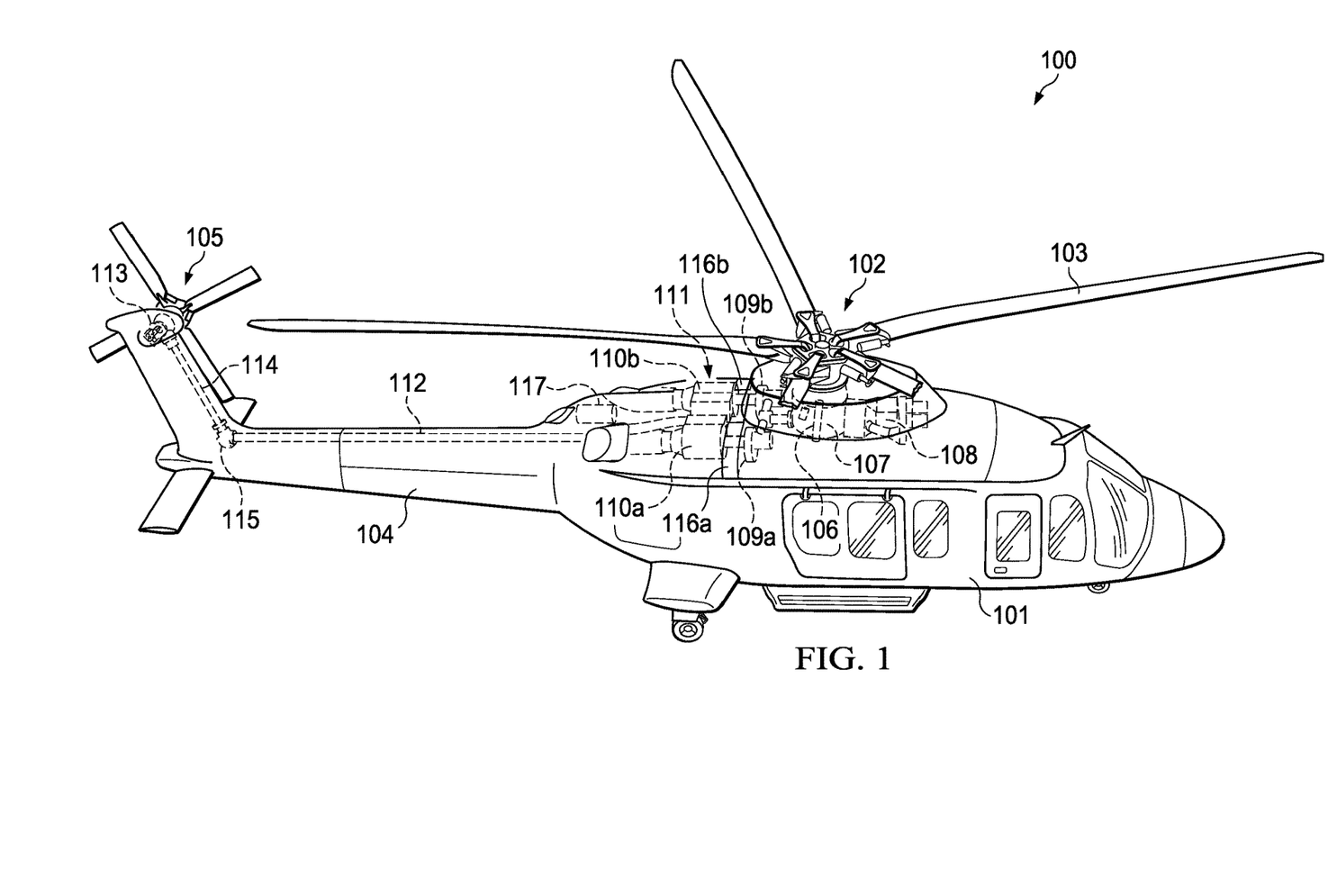
FIG. 1 depicts a rotorcraft adapted for use with embodiments of the present disclosure.

FIG. 1 depicts a rotorcraft 100 in accordance with embodiments of the present application. In the exemplary embodiment, rotorcraft 100 is a helicopter having a fuselage 101 with an airframe (not shown) and a rotor system 102 coupled to the airframe. A plurality of rotor blades 103 is operably associated with a rotor system 102 for creating flight. The pitch of each rotor blade 103 can be managed or adjusted to selectively control direction, thrust, and lift of the rotorcraft 100.

A tail boom 104 is depicted that further includes tail rotor and anti-torque system 105. The tail structure 104 may be used as a horizontal stabilizer. Rotorcraft 100 further includes a rotor mast 106, which connects the main rotor 102 to a main rotor gearbox 107. The main rotor gearbox 107 is connected to one or more accessory gear boxes 108 and one or more reduction gearboxes 109a, 109b. Each reduction gearbox 109a, 109b is connected to one or more engines 110a, 110b, which are within an engine compartment 111. A tail rotor drive shaft 112 transmits mechanical rotation to a tail rotor gear box 113, which is connected to the reduction gearboxes 109a, 109b via tail rotor drive shaft 114 and intermediate gear box 115.

Engines 110a, 110b are the primary source of power for rotorcraft 100. Torque is supplied to the rotor system 102 and the anti-torque system 105 using engines 110a and 110b. Engine air intake panels 116a, 116b on top of rotorcraft 100 feed inlet air to engines 110a, 110b through engine inlet plenums. An auxiliary power unit (APU) 117 may be used to rotate turbines in engines 110a, 110b to generate initial engine RPM (revolutions per minute) during start. In other embodiments, engines 110a, 110b may be started using an electrical starter/generator (not shown) that is mounted on the engine accessory gearboxes. Engines 110a, 110b may also be started using cross-bleed air from the other engine if one of the engines is already running.

Figure 2A:
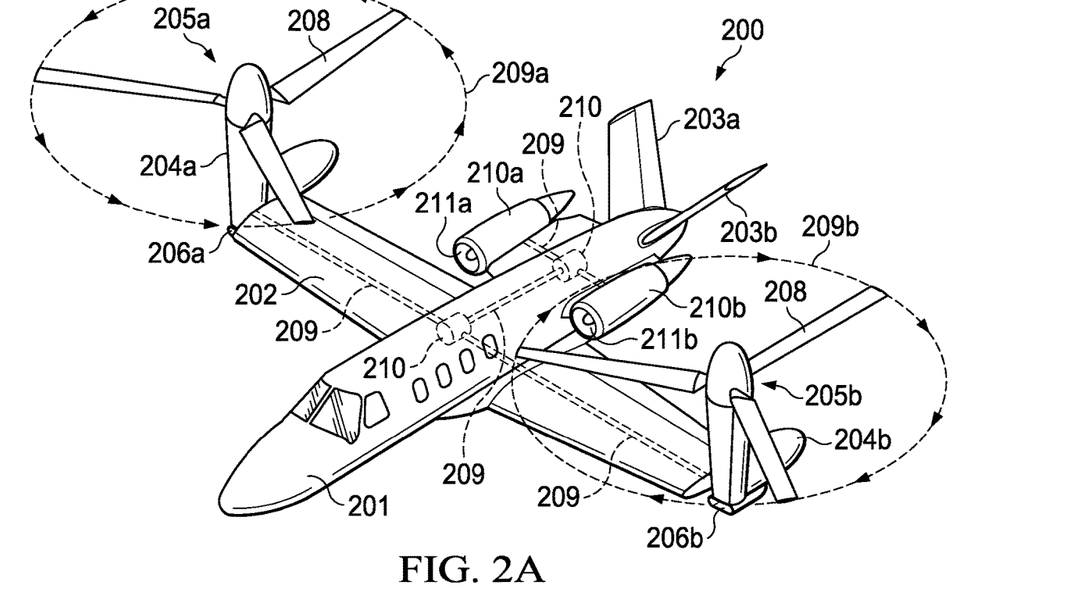
FIGS. 2A and 2B depict a tiltrotor aircraft adapted for use with embodiments of the present disclosure.
Figure 2B:
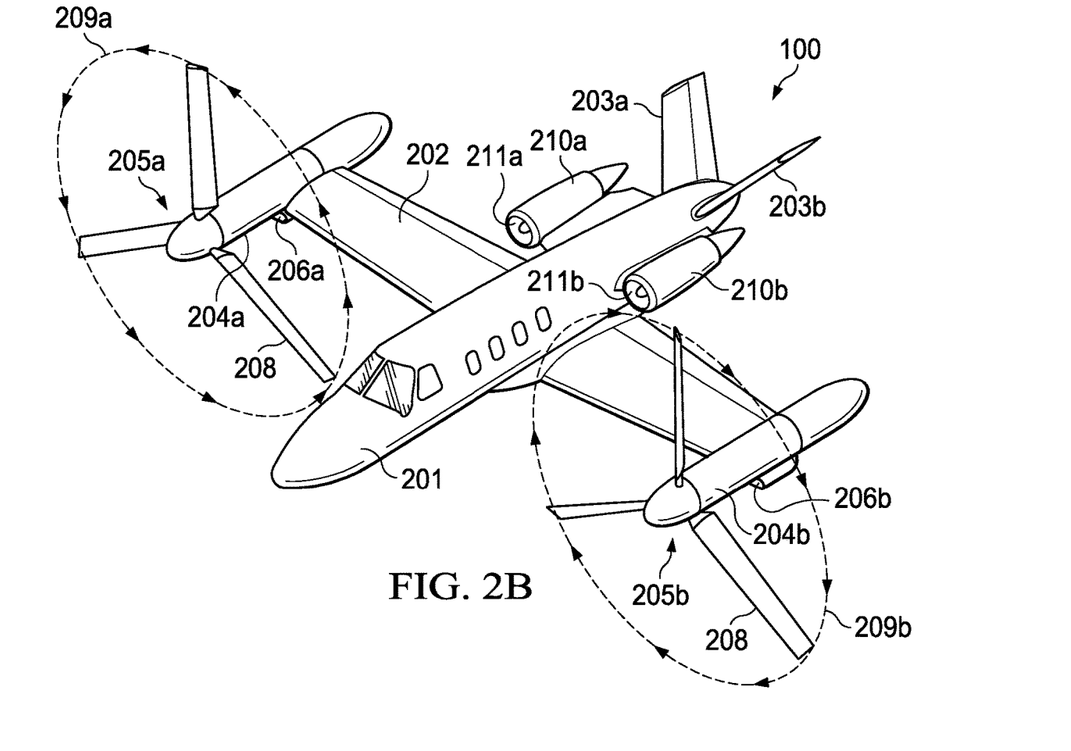

Referring to FIGS. 2A and 2B, a tiltrotor aircraft is schematically illustrated and generally designated 200. Tiltrotor aircraft 200 includes a fuselage 201, a wing 202, and tail assemblies 203a, 203b. Tiltrotor aircraft 200 further includes control surfaces, such as ailerons, flaps, slats, spoilers, elevators, rudders, or ruddervators, operable for horizontal and/or vertical stabilization during forward flight. Pylon assemblies 204a, 204b are located at the outboard ends of wing 202 and are rotatable relative to wing 202 between a generally vertical orientation, as shown in FIG. 2A, and a generally horizontal orientation, as shown in FIG. 2B. Pylon assemblies 204a, 204b may comprise a fixed portion that is attached to wing 202 and a moveable portion that rotates or pivots relative to wing 202 as illustrated in the drawings. In other embodiments, the entire pylon assemblies 204a, 204b may rotate relative to wing 202.

Pylon assemblies 204a, 204b each house a portion of a drive system that is used to rotate proprotor assemblies 205a, 205b, respectively. The drive system within each of pylon assemblies 204a, 204b may comprise, for example, drive shafts, gearboxes, and engines in some embodiments. Air intakes 206a, 206b provide inlet air flow for embodiments having engines in pylon assemblies 204a, 204b. Each proprotor assembly 205a, 205b includes a plurality of proprotor blades 208 that are operable to be rotated $209_a$, $209_b$ to create vertical or horizontal thrust.

Alternatively, a separate drive system, such as engines 210a, 210b, may be located on the aft portion of fuselage 201. Air intakes 211a, 211b provide engine inlet air to engines 210a, 210b. In one embodiment, engines 210a, 210b may be operable in a turboshaft mode in which they provide torque and rotational energy to proprotor assemblies 205a, 205b via rotor drive shafts 209 and intermediate gear boxes 210. Alternatively, engines 210a, 210b may be operable in a turbofan mode in which they provide a rearward-directed thrust to propel tiltrotor aircraft 200 forward. An APU (not shown) may be used to rotate turbines in engines 210a, 210b to develop the required RPM during engine start. In other embodiments, engines 210a, 210b may be started using an electrical starter/generator (not shown) that is mounted on the engines or on the engine accessory gearboxes. Alternatively, cross-bleed air may be used to start one engine 210a, 210b if the other engine is already running.

FIG. 2A illustrates tiltrotor aircraft 200 in VTOL or helicopter flight mode, in which proprotor assemblies 205a, 205b are rotating 208a, 208b in a substantially horizontal plane to provide a lifting thrust, such that tiltrotor aircraft 200 flies much like a conventional helicopter. In this configuration, engines 210a, 210b are operable in turboshaft mode wherein combustion gases in each engine 210a, 210b cause rotation of a power turbine coupled to an output shaft 209 that is used to power the drive system coupled to the respective proprotor assemblies 205a, 205b.

FIG. 2B illustrates tiltrotor aircraft 200 in proprotor forward flight mode, in which proprotor assemblies 205a, 205b are rotating in a substantially vertical plane to provide a forward thrust thereby enabling wing 202 to provide a lifting force responsive to forward airspeed, such that tiltrotor aircraft 200 flies much like a conventional propeller driven aircraft. Blades 208 may also be feathered and folded in other embodiments in which forward thrust is provided solely by either or both engines 210a and 210b in a jet mode.

It should be appreciated that the rotorcraft 100 and tiltrotor aircraft 200 are merely illustrative of a variety of aircraft that can be used to implement embodiments of the present disclosure. Other aircraft implementations can include, for example, any configuration of tiltrotor, fixed-wing, hybrid, manned or unmanned, gyrocopter, helicopter, or drone aircraft, among other examples. Moreover, it should be appreciated that even though aircraft are particularly well suited to implement embodiments of the present disclosure, the described embodiments can also be implemented using non-aircraft vehicles and devices.

Figure 3:
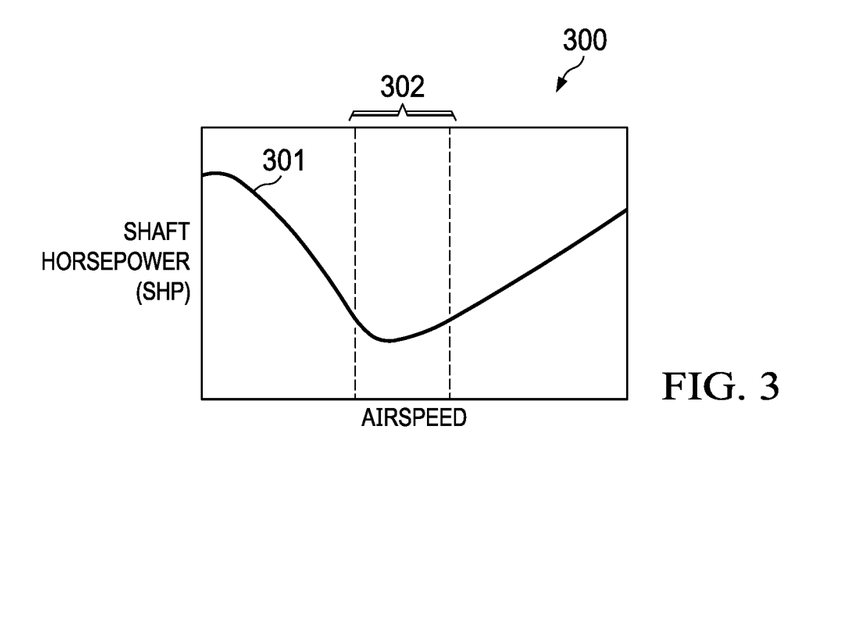
FIG. 3 is a graph illustrating shaft horsepower (SHP) required versus airspeed for a typical rotorcraft.

FIG. 3 is a graph 300 illustrating shaft horsepower (SHP) required versus airspeed for a typical rotorcraft. Curve 301 shows that the power required (SHP) decreases as airspeed increases until reaching a part power required at a cruise airspeed range 302. As airspeed increases above the cruise airspeed range 302, the required power begins to increase. For rotorcraft aircraft, such as helicopters and tiltrotor aircraft, operation in level flight or in a cruise mode typically requires less engine power than the take-off and landing phases of flight. Accordingly, in a typical rotorcraft, it is generally more efficient to operate the aircraft at a cruise airspeed when possible, which requires a relatively low part power setting; however, as discussed below, fuel efficiency in a rotorcraft aircraft engine is less than optimal when operating at part power.

Figure 4:
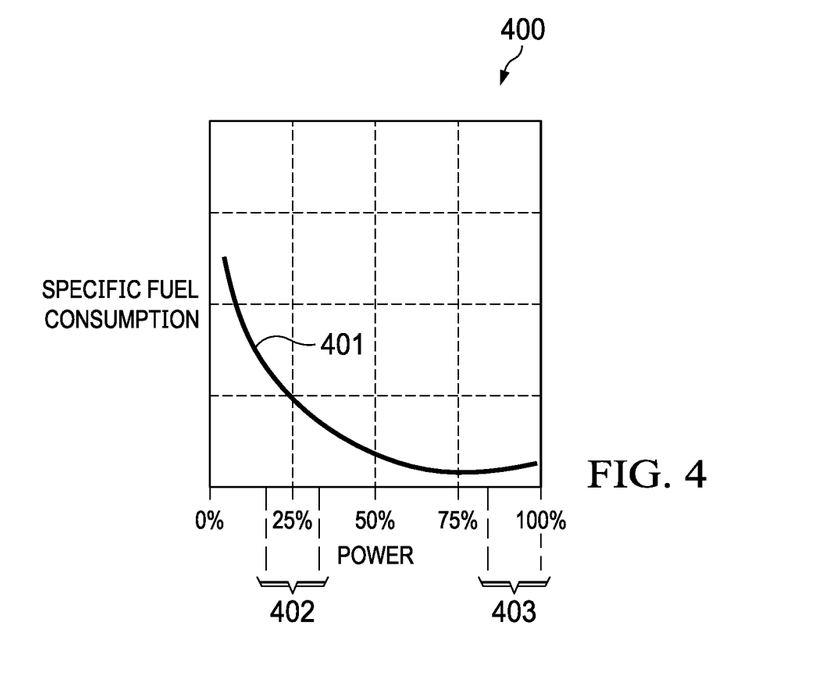
FIG. 4 is a graph illustrating specific fuel consumption (SFC) versus engine power for a typical rotorcraft engine.

FIG. 4 is a graph 400 illustrating specific fuel consumption versus engine power for a typical rotorcraft engine. Curve 401 shows that the fuel required per horsepower decreases as engine power increases until reaching a minimum fuel required per horsepower at high power settings. At low power settings, such as in a typical part power range 402, the rotorcraft engine is less efficient than in a high power setting, such as in a takeoff power range 403. Accordingly, for a typical rotorcraft engine, it is generally more efficient to operate the engine at high power settings. As noted in FIG. 3, in cruise mode flight, the rotorcraft engines typically operate at part power instead of the more fuel-efficient high power range.

To avoid lower engine fuel efficiency at part power, aircraft configurations that require more efficient engine operation are being explored. For twin-engine aircraft, one configuration of interest is to establish cruise-mode flight with one engine intentionally shut down, which allows the remaining engine to operate at a higher power (than what would be required if both engines were operating) and in a more efficient manner. Observations indicate that fuel savings of approximately 15% are possible using single-engine cruise. For safety of flight reasons, in the event that additional power is required quickly, single-engine configurations require a rapid engine-restart capability for the engine that was intentionally shut down. The use of more powerful engine starters may provide the necessary rapid restart capability, but such starters are heavier than typical starters and add to aircraft weight.

In-flight engine restart time may be improved utilizing engine inlet guide vanes or other hinged-door concepts to control ram airflow into the engine. Ram air enters the engine inlet and then flows through the engine's compressor section forcing the engine to spin up (referred to as "windmilling") prior to engaging the starter to initiate the start sequence. Managing the ram airflow through the engine inlet allows for a more rapid engine restart. Also, windmilling the engine prior to in-flight restart reduces the starter power required, which requires a smaller/lighter starter. Windmilling the engine also enables a more rapid engine start time, reduces fuel consumption, and increases aircraft range. While the engine is off during flight, accessory systems, such as the oil and lubrication system, may not operate properly. Accordingly, the engine inlet guide vanes or a hinged-door is kept closed while the engine is off. This prevents ram airflow through the engine to ensure that the engine does not rotate, thereby preventing damage to rotating components without proper lubrication.

Figure 5:
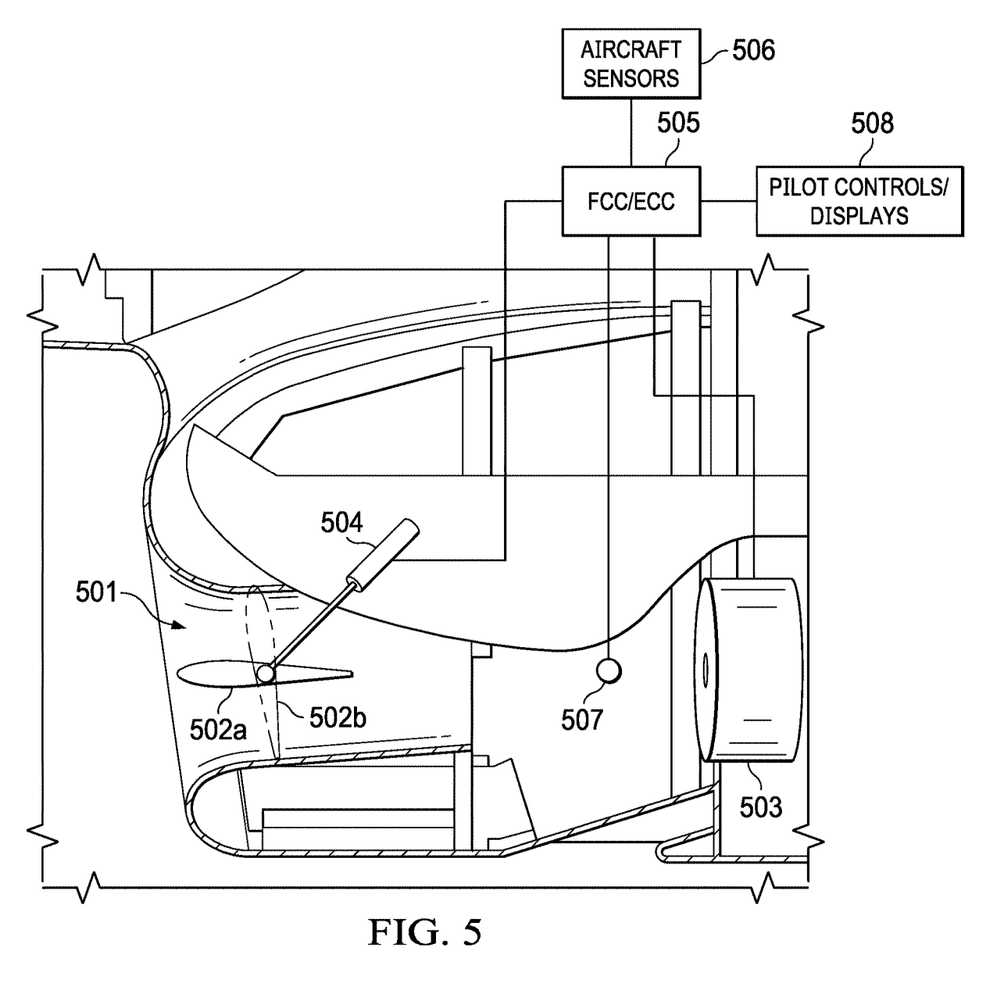
FIG. 5 is a cross-section view of an engine inlet depicting the operation of an inlet door according to one embodiment.

FIG. 5 is a cross-section view of an engine inlet 501 depicting the operation of an inlet door 502 in some embodiments. During flight, ram air flows into engine inlet 501, which directs the air to a compressor section of aircraft engine 503. During normal engine operation, the inlet door is open generally in the position shown as 502a. When the engine is shut down during flight, the inlet door is closed as shown in position 502b. The positioning of inlet door 502 between the open and closed positions is controlled by an actuator 504, which may be any mechanical, electrical, or hydraulic actuator. A flight control computer (FCC) or engine control computer (ECC) 505 sends commands to actuator 504 to manage the position of inlet door 502. Although inlet door 502 is illustrated in FIG. 5 as being full open 502a or full closed 502b, it will be understood that actuator 504 may configure the position of door 502 in any intermediate location. This allows FCC/ECC 505 to control the amount of airflow entering engine inlet 501.

By controlling the airflow entering engine inlet 501, the embodiments disclosed herein provide for optimization of the restart sequence. In one embodiment, when an in-flight restart sequence is initiated, FCC/ECC 505 positions door 502 to a fully open position 502a to allow maximum airflow to begin flowing into engine inlet 501. Then FCC/ECC 505 monitors engine inlet airflow and engine 503 parameters and adjusts the position of door 502 to provide an optimal ram airflow. FCC/ECC 505 continues to adjust door 502 to "tune" the engine inlet area to a configuration that will provide optimal ram airflow and thereby create optimal engine windmilling RPM. This allows the starter to be engaged as quickly as possible so that engine 503 will start in the fastest, most optimal manner possible. This allows the aircraft to operate in the safest and most efficient manner possible by ensuring that the shutdown engine can be restarted immediately if an in-flight emergency occurs or if there is a mission change.

Engine inlet door 502 may be located, for example, in engine air intake panels 116a, 116b on rotorcraft 100 or in pylon engine inlets 206a, 206 or in external engine inlets 211a, 211b for tiltrotor aircraft 200. Although illustrated as a single door pivoting at a midpoint in FIG. 5, it will be understood that other configurations may be used for engine inlet door 502, such as louvered doors, folding doors, doors having hinges positioned at an edge instead of in the middle, or any other appropriate barrier.

FCC/ECC 505 may be coupled directly or indirectly to aircraft sensors 506, such as airspeed, altitude, or outside air temperature sensors that provide information about the current environment conditions during an engine shut down or engine restart. FCC/ECC 505 may also be coupled directly or indirectly to sensors 507 in engine inlet 501, such as airflow, pressure, or other sensors that provide information about the volume, speed, or other qualities of the ram air provided to engine 503. FCC/ECC 505 is connected to pilot controls and displays 508, which allows FCC/ECC 505 to monitor the current position of a throttle or collective control and the position of switches, such as engine starter switches and engine fuel control switches.

A pilot may shut down engine 503 by switching fuel flow to off and/or by moving a throttle to off. These inputs are reported to FCC/ECC 505. When engine 503 is shut down during flight, FCC/ECC 505 may monitor various parameters of engine 503, such as RPM, temperature, and other conditions. Once the engine's RPM and temperature have dropped below predetermined thresholds, FCC/ECC 505 commands actuator 504 to close inlet door 502. This prevents windmilling of the engine while lubrication systems are not operating, preventing damage to the engine rotating parts. FCC/ECC 505 may control the rate at which inlet door 502 is closed in order to manage the airflow into engine 503 as it winds down. For example, a predetermined inlet door closing schedule may be used to ensure that the RPM of engine 503 is reduced in a controlled manner so that sufficient cooling is allowed and to minimize engine wear.

When the pilot desires to restart engine 503, such as by advancing the throttle out of the "off" position and/or moving a starter or fuel switch to on, FCC/ECC 505 will command actuator 504 to open inlet door 502. FCC/ECC 505 may simply open inlet door 502 to a fully open position 502a and allow ram air to begin flowing into engine inlet 501. Alternatively, FCC/ECC 505 may control the rate at which inlet door 502 is opened in order to manage the rate of airflow increase into engine 503. FCC/ECC 505 may monitor environmental conditions at the time of restart using aircraft sensors 506, such as the airspeed, air pressure, and outside temperature. These environmental conditions may be used along with data from engine inlet sensor 507 to control actuator 504. The rate and degree to which inlet door 502 is opened may be managed using a predetermined schedule. Alternatively, the current aircraft, engine, and environmental conditions may be evaluated by FCC/ECC 505 to optimize the start-up sequence for engine 503. For example, FCC/ECC 505 may open inlet door 502 faster when the aircraft operating is at high altitude, in high temperatures, and/or low airspeed to allow maximum airflow. FCC/ECC 505 may open inlet door 502 at a relatively slower rate in low altitude, low temperature, and/or high airspeed conditions in order to manage the volume of air provided to engine 503.

Figure 6:
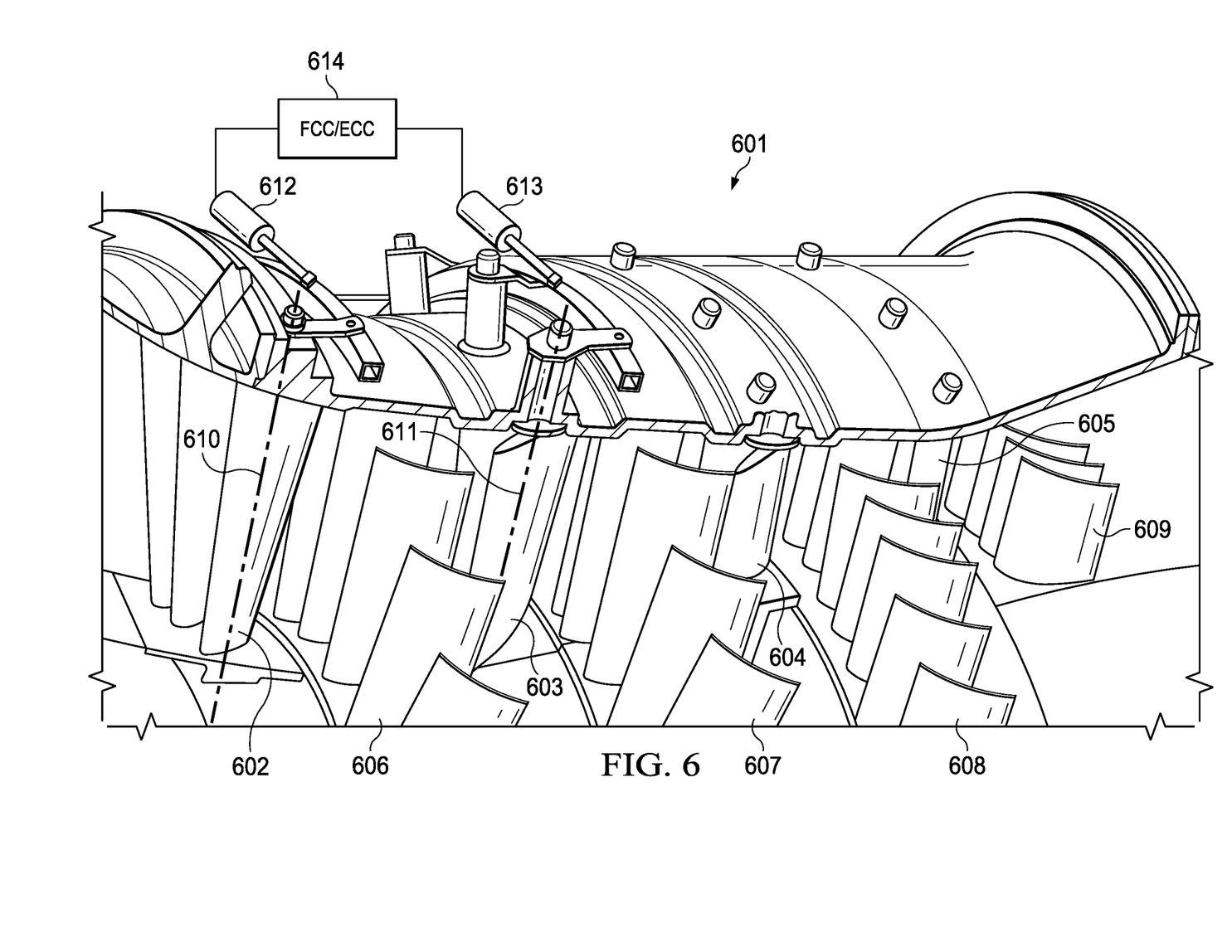
FIG. 6 depicts an engine compressor section that is configured to control the airflow to an engine using inlet guide vanes according to an alternative embodiment.

FIG. 6 depicts an engine compressor section 601 that is configured to manage airflow into an engine according to an alternative embodiment. Compressor 601 includes one or more sets of inlet variable guide vanes 602-603 at the engine inlet, and one or more sets of fixed stator vanes 604-605. A plurality of sets of rotor blades 606-609 are interspaced with the inlet variable guide vanes 602-603 and the fixed stator vanes 604-605. Rotor blades 606-609 rotate around the engine's longitudinal axis as air flows through the compressor 601. Inlet variable guide vanes 602-603 are configured to rotate about vane axes 610 and 611, respectively. Fixed stator vanes 604, 605 do not rotate. Actuator 612 is configured to rotate inlet variable guide vanes 602, and actuator 613 is configured to rotate inlet variable guide vanes 603. During an inflight engine shut down or restart, FCC/ECC 614 controls the operation and position of actuators 612 and 613.

Instead of using an inlet door as described in connection with FIG. 5, compressor section 601 uses inlet guide vanes 602 to open and close the engine air intake to manage ram air entering the engine. When the engine is shut down during flight, FCC/ECC 614 commands actuator 612 to rotate inlet guide vanes 602 to a closed position so that air will not enter the engine. When the engine begins an in-flight restart, FCC/ECC 614 commands actuator 612 to rotate inlet guide vanes 602 to an opened position. As described in connection with FCC/ECC 505 (FIG. 5), FCC/ECC 614 may also control the rate and degree to which inlet guide vanes 602 are opened and closed. Inlet guide vanes 602 may be managed using a predetermined schedule. Alternatively, the current aircraft, engine, and environmental conditions may be used by FCC/ECC 614 to determine how fast and how wide to open inlet guide vanes 602 during engine restart. In some embodiments, FCC/ECC 614 may also control variable inlet guide vanes 603 in addition to variable inlet guide vanes 602 during engine restart in order to manage more precisely the airflow through compressor 601.

When an in-flight restart sequence is initiated, FCC/ECC 614 positions variable inlet guide vanes 602 and/or variable inlet guide vanes 603 to a fully open position to allow maximum airflow to begin flowing into engine 601. FCC/ECC 614 monitors engine inlet airflow and engine 601 parameters and adjusts the position of variable inlet guide vanes 602, 603 to provide an optimal ram airflow. FCC/ECC 614 continues to adjust variable inlet guide vanes 602, 603 to modify the engine inlet area to a configuration that will provide optimal ram airflow and thereby create optimal engine windmilling RPM. This allows the starter to be engaged as quickly as possible so that engine 601 will start in the fastest, most optimal manner possible.

Figure 7A:
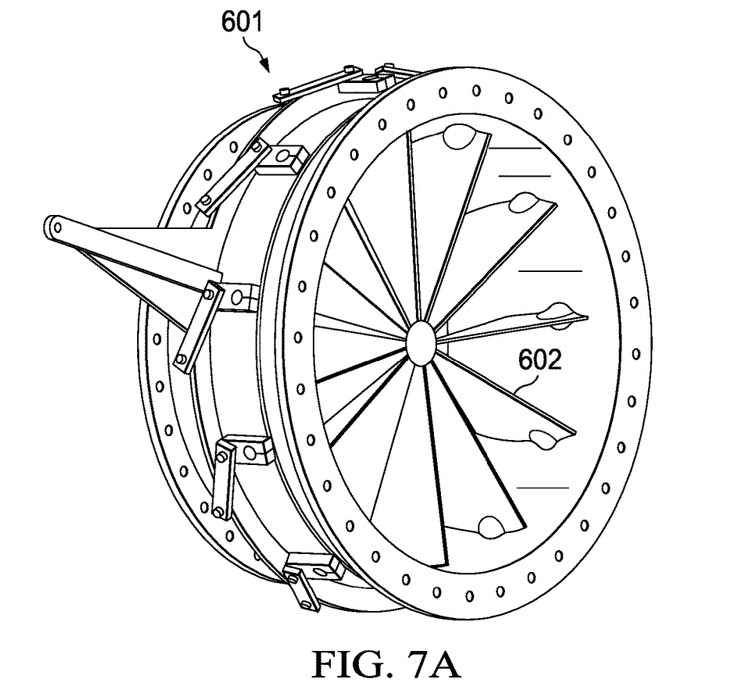
FIGS. 7A-7C depict the inlet guide vanes of the compressor in FIG. 6 at various configurations between full open and full closed.
Figure 7B:
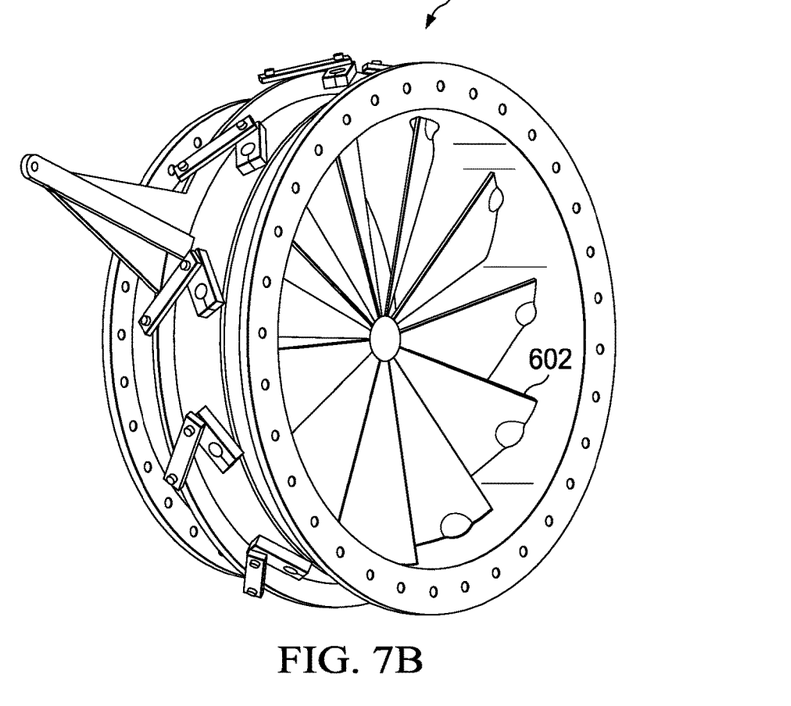
Figure 7C:
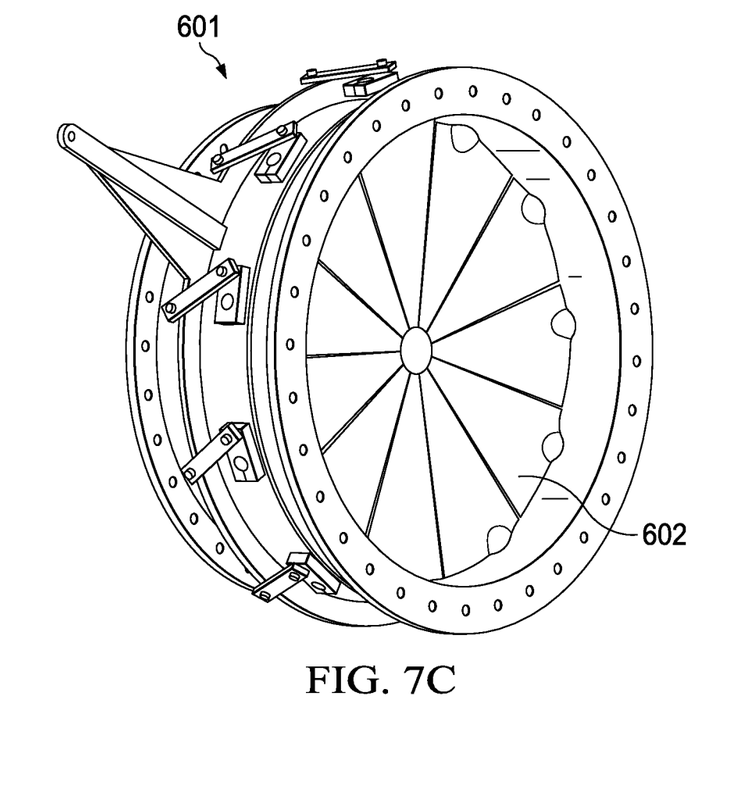

FIGS. 7A-7C depict inlet guide vanes 602 of compressor 601 (FIG. 6) in various configurations between full open (FIG. 7A) to full closed (FIG. 7C) positions. As illustrated in FIG. 7C, inlet guide vanes 602 may be rotated to a completely closed when the engine is shut down. This blocks any ram air from entering the compressor 601, which prevents the engine from windmilling. When the engine is restarted, the inlet guide vanes 602 are opened either partially (FIG. 7B) or fully (FIG. 7A). The rate and degree to which inlet guide vanes 602 are opened may be controlled by FCC/ECC 614, for example, so that ram air enters compressor 601 at the optimal rate to windmill the engine so that RPM increases in minimal time during restart.

Figure 8:
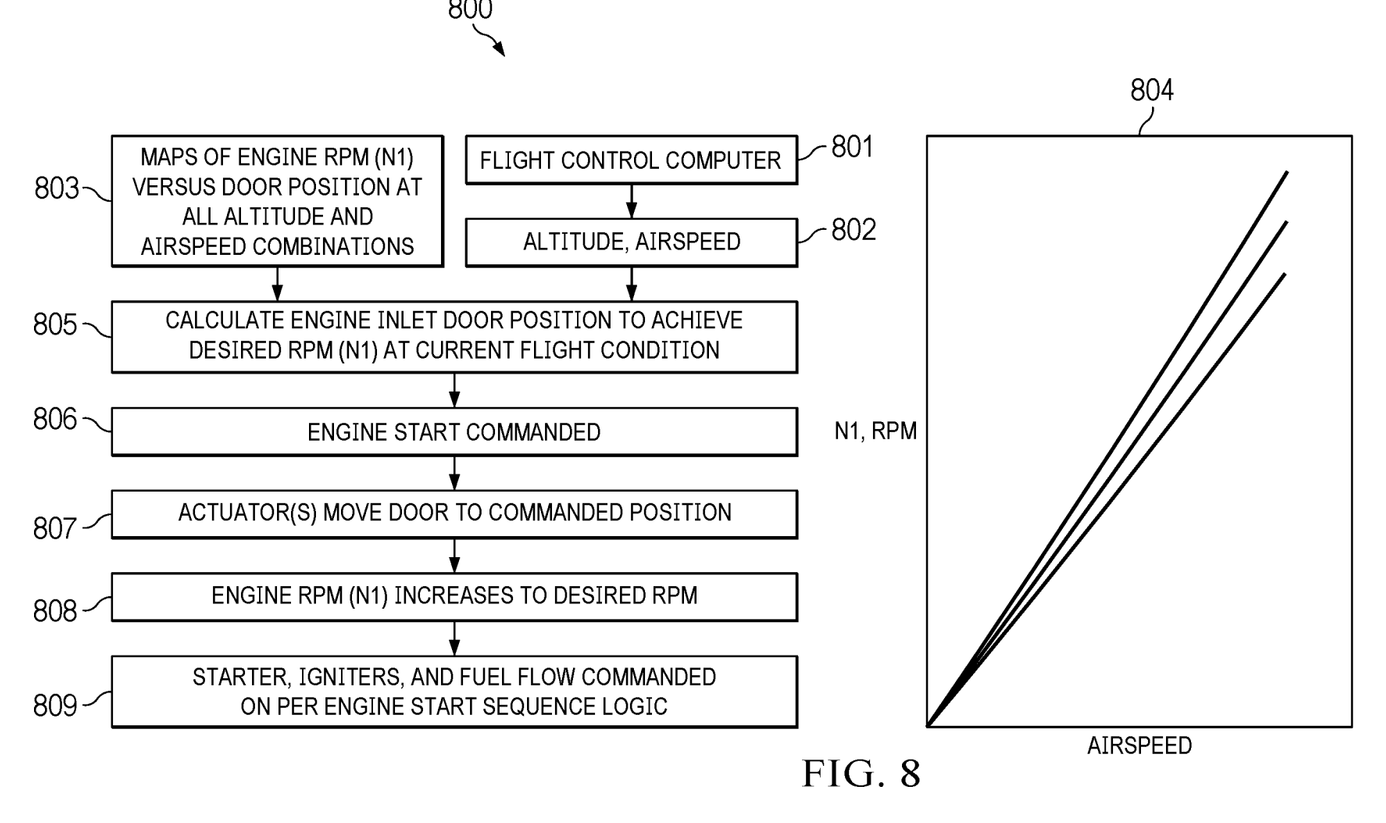
FIG. 8 is a flowchart illustrating an algorithm for adjusting the opening of an engine inlet based upon flight conditions during an in-flight engine restart according to an example embodiment.

FIG. 8 is a flowchart 800 illustrating an algorithm for adjusting the opening of an engine inlet based upon flight conditions during an in-flight engine restart according to an example embodiment. The algorithm may be embodied as computer instructions that are executed on a processor, such as a program executing in a flight control computer or engine control computer in an aircraft. In step 801, a flight control computer monitors aircraft and engine parameters. In step 802, the aircraft's current airspeed and altitude are determined. This data may be collected from an aircraft's pitot-static system, temperature probes, and other sensors. In step 803, aircraft performance charts are referenced, such as chart 804, which may provide, for example, the engine's rotational speed (RPM) that is required for the current conditions, such as current airspeed, altitude, or temperature. The performance charts 804 may provide, for example, plots of the engine's gas producer turbine (referred to as "N1" or "Ng") RPM versus airspeed at different altitudes and temperatures. The performance charts 804 may be available in an aircraft or rotorcraft flight manual, for example, and the data from the charts may be stored in a table in the flight control computer's memory.

In step 805, the position of the engine inlet door is calculated. The door position is determined based upon the engine performance charts referenced in step 803 and the aircraft's current conditions as determined in step 802.

In step 806, when a pilot commands an in-flight engine start, the required engine inlet door position is received from step 805. The flight control computer then commands the engine inlet door actuators to move the door to the required position at step 807. As the inlet door is opened, the engine N1 RPM increase is monitored in step 808 until it reaches the desired RPM as calculated from the engine performance charts. In step 809, the starter, igniters, and fuel flow are commanded to "on" pursuant to the aircraft's engine start sequence logic. The aircraft engine will then start, and the N1 RPM will rise to the operating range as thrust or shaft power is generated by the engine. The pilot may then use both engines to fly the aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for controlling an aircraft engine inlet, comprising:
    maintaining an engine inlet barrier in a closed position while an engine is shut down during flight;
    determining a required engine RPM for an engine in-flight restart based upon current aircraft parameters;
    detecting a command to initiate the engine in-flight restart;
    managing a position of the engine inlet barrier to control a volume of ram air entering an engine intake;
    monitoring parameters of the ram air in the engine intake; and
    adjusting the position of the engine inlet barrier, in response to the parameters of the air in the engine intake, such that the ram air causes the engine to achieve the required engine RPM.

2. The method of claim 1, wherein the required engine RPM is gas generator speed.

3. The method of claim 1, wherein the engine inlet barrier is a hinged door positioned within the engine inlet.

4. The method of claim 1, wherein the engine inlet barrier is a series of engine inlet variable guide vanes that are configured to rotate between a closed position and an opened position.

5. The method of claim 1, wherein the position of the engine inlet barrier is controlled by a flight control computer or an engine control computer.

6. The method of claim 1, further comprising:
    monitoring current aircraft parameters, wherein the aircraft parameters comprise one or more of: an airspeed, an altitude, and an outside air temperature; and
    wherein the required engine RPM for the engine in-flight restart is updated at regular intervals or when the current aircraft parameters change by a threshold amount.

7. The method of claim 1, further comprising:
    detecting a command to shut down the engine while in flight; and
    managing the position of the engine inlet barrier to block ram air from entering the engine intake.

8. The method of claim 7, further comprising:
    monitoring engine parameters during a shutdown sequence; and
    closing the engine inlet barrier when the engine is below a minimum engine RPM.

9. The method of claim 1, further comprising monitoring a current engine RPM, and wherein adjusting the position of the engine inlet barrier further comprises adjusting the position of the engine inlet barrier, in response to the parameters of the air in the engine intake and the current engine RPM, to maximize the rate at which the engine achieves the required engine RPM.

10. The method of claim 1, wherein managing the position of the engine inlet barrier comprises:
    adjusting the position of the engine inlet barrier according to a predetermined schedule.

11. The method of claim 1, wherein the required engine RPM is determined from aircraft performance chart data.

12. The method of claim 1, wherein managing the position of the engine inlet barrier comprises:
    providing a command to one or more actuators to adjust the engine inlet barrier to conform to a calculated engine inlet area.

13. An aircraft, comprising:
    an engine inlet configured to provide air to an engine during flight;
    an engine inlet barrier configured to manage a volume of air provided to the engine;
    a flight control system configured to:
        maintain the engine inlet barrier in a closed position while the engine is shut down during flight
        determine a required engine RPM for an engine in-flight restart based upon current aircraft parameters;
        manage a configuration of the engine inlet barrier to control the volume of air entering the engine inlet during the engine in-flight restart, the volume of air selected to cause the engine to achieve the required engine RPM;
        monitor parameters of the air in the engine intake during the engine in-flight restart; and
        adjust the configuration of the engine inlet barrier during the engine in-flight restart, in response to the parameters of the air in the engine intake during the engine in-flight restart, to achieve the volume of air selected to cause the engine to achieve the required engine RPM.

14. The aircraft of claim 13, wherein the flight control system is further configured to:
    determine the required engine RPM after detecting a command to initiate the engine in-flight restart.

15. The aircraft of claim 13, wherein the engine inlet barrier is a hinged door positioned within the engine inlet.

16. The aircraft of claim 13, wherein the engine inlet barrier is a series of engine inlet variable guide vanes that are configured to rotate between a closed position and an opened position.

17. The aircraft of claim 13, wherein the flight control system is further configured to:
    detect a command to shut down the engine while in flight; and
    manage the position of the engine inlet barrier to block air from entering the engine intake.

18. A flight control computer for an aircraft, comprising:
    one or more processors;
    one or more non-transitory computer-readable storage media having stored thereon computer-executable instructions that, when executed by the one or more processors, causes the processors to:
        maintain an engine inlet barrier in a closed position while an engine is shut down during flight;
        determine a required engine RPM for an engine in-flight restart based upon current aircraft parameters;
        select a volume of air entering an engine intake during the engine in-flight restart to cause the engine to achieve the required engine RPM; and
        manage a configuration of the engine inlet barrier to control the volume of air entering the engine intake during the engine in-flight restart;
        monitor parameters of the air in the engine intake during the engine in-flight restart; and
        adjust the position of the engine inlet barrier during the engine in-flight restart, in response to the parameters of the air in the engine intake during the engine in-flight restart, to achieve the volume of air selected to cause the engine to achieve the required engine RPM.

19. The flight control computer of claim 18, wherein the computer-executable instructions further cause the processors to:
    monitor a current engine RPM during the engine in-flight restart; and
    adjust the position of the engine inlet barrier, in response to the parameters of the air in the engine intake during the engine in-flight restart and the current engine RPM during the engine in-flight restart, to maximize the rate at which the engine achieves the required engine RPM.

20. The flight control computer of claim 18, wherein the computer-executable instructions further cause the processors to:
    adjust the position of the engine inlet barrier according to a predetermined schedule.

* * * * *